(12) United States Patent
Naruishi et al.

(10) Patent No.: US 9,102,452 B2
(45) Date of Patent: Aug. 11, 2015

(54) INDICATOR FOR AN IMPACT DETECTOR, AN IMPACT DETECTOR, AND A PACKAGING CONTAINER

(71) Applicants: Moku Naruishi, Kawasaki (JP); Tsutomu Kawase, Atsugi (JP)

(72) Inventors: Moku Naruishi, Kawasaki (JP); Tsutomu Kawase, Atsugi (JP)

(73) Assignee: RICOH COMPANY, LTD., Tokyo (JP)

( * ) Notice: Subject to any disclaimer, the term of this patent is extended or adjusted under 35 U.S.C. 154(b) by 97 days.

(21) Appl. No.: 14/013,269

(22) Filed: Aug. 29, 2013

(65) Prior Publication Data

US 2014/0069837 A1    Mar. 13, 2014

(30) Foreign Application Priority Data

Sep. 11, 2012    (JP) .................................. 2012-199413

(51) Int. Cl.
*G01N 3/30*    (2006.01)
*B65D 79/02*    (2006.01)
*G01P 15/03*    (2006.01)

(52) U.S. Cl.
CPC ............. *B65D 79/02* (2013.01); *G01P 15/036* (2013.01)

(58) Field of Classification Search
CPC ..... G01P 15/036; G01P 15/032; G01P 1/127; G01P 15/18; G01P 15/00; G01P 13/00; G01C 9/10; G01C 9/00; G01C 2009/107; G01L 5/0052; B65D 79/02

USPC ......................................................... 73/12.09
See application file for complete search history.

(56) References Cited

U.S. PATENT DOCUMENTS

| | | | | |
|---|---|---|---|---|
| 3,688,734 | A * | 9/1972 | Davis et al. .................... | 116/215 |
| 3,926,144 | A * | 12/1975 | Lander .......................... | 116/215 |
| 8,074,489 | B2 * | 12/2011 | Ishikawa et al. .............. | 73/12.04 |
| 8,234,993 | B2 * | 8/2012 | Naruishi et al. ............... | 116/203 |
| 8,240,270 | B2 * | 8/2012 | Naruishi ........................ | 116/203 |
| 8,307,775 | B2 * | 11/2012 | Naruishi et al. ............... | 116/203 |
| 8,493,225 | B2 * | 7/2013 | Naruishi et al. ............... | 340/665 |
| 2009/0249858 | A1 * | 10/2009 | Ishikawa et al. .............. | 73/12.06 |
| 2010/0050733 | A1 | 3/2010 | Naruishi et al. | |
| 2010/0281946 | A1 | 11/2010 | Naruishi et al. | |
| 2010/0300178 | A1 | 12/2010 | Naruishi et al. | |
| 2011/0090090 | A1 | 4/2011 | Naruishi et al. | |
| 2014/0047897 | A1 * | 2/2014 | Naruishi ........................ | 73/12.01 |

FOREIGN PATENT DOCUMENTS

| | | |
|---|---|---|
| JP | 2009-156726 | 7/2009 |
| JP | 2011-237351 | 11/2011 |
| JP | 2012-016898 | 1/2012 |
| JP | 2012-016899 | 1/2012 |

* cited by examiner

*Primary Examiner* — Freddie Kirkland, III
(74) *Attorney, Agent, or Firm* — Oblon, McClelland, Maier & Neustadt, L.L.P.

(57) ABSTRACT

An indicator for an impact detector includes a plurality of display parts to display a detector to outside of the indicator when an impact or force changes a condition of the detector. At least one of the plurality of display parts is a dummy display part. The impact detector can be disposed on a package of a packaging container.

20 Claims, 9 Drawing Sheets

INDICATOR FOR AN IMPACT DETECTOR, AN IMPACT DETECTOR, AND A PACKAGING CONTAINER

CROSS-REFERENCE TO RELATED APPLICATIONS

This patent application is based on and claims priority to Japanese Patent Application No. 2012-199413, filed on Sep. 11, 2012 in the Japan Patent Office, the contents of which are hereby incorporated by reference herein in its entirety.

BACKGROUND OF THE INVENTION

1. Field of the Invention

The present invention generally relates to an indicator to indicate impact, an impact detector to detect impact to an article, and a packaging container including the impact detector.

2. Discussion of the Background Art

An article, such as a precision instrument, might be damaged by handling in the transport process. In case the impact that the article is subjected to is less than a predetermined value, preventive measures can be taken with a package to prevent damage to the article therein. However, it is difficult to completely prevent damage to the article when the article is subjected to an impact which is greater than the predetermined value due to the carrier's operational error or rough handling.

An inspector can find the damage to an article by inspection in the case of a greatly damaged package. On the other hand, the article may be damaged even though the package is not damaged. The customer will notice the damage to the article when the customer opens the package. This may result in a complaint by the customer or lowering of the customer's satisfaction. Therefore, it is known to equip the package with an impact detector, and the impact detector detects impacts to the package.

Japanese unexamined Patent Application No. 2009-156726 discloses an impact detector that displays a history of impacts to the packaged article with the position of the weights.

Japanese unexamined Patent Application No. 2011-007771 discloses an impact detector that includes a weight, a lid, and a case body, and the impact detector indicates the impact of one direction or an opposite direction.

However, when the carrier understands the indicating of the impact detector, the carrier might remove the impact detector or tamper with the impact detector.

SUMMARY OF THE INVENTION

In view of the foregoing, one illustrative embodiment of the present invention provides an indicator for an impact detector that includes a plurality of display parts to display a detector to outside of the indicator when an impact or force changes a condition of the detector. At least one of the plurality of display parts is a dummy display part. Another illustrative embodiment provides an impact detector including a detector having a moveable weight to receive an impact or a force, a cover having a path to guide the weight from an initial position to a display position, and an indicator including a plurality of display parts to display the detector to outside of the indicator when the impact or force moves the weight from the initial position to the display position. At least one of the plurality of display parts is a dummy display part.

Another illustrative embodiment provides a packaging container including a package and an impact detector disposed on the package. The impact detector includes a detector having a moveable weight to receive an impact or a force, a cover having a path to guide the weight from an initial position to a display position, and an indicator including a plurality of display parts to display the detector to outside of the indicator when the impact or force moves the weight from the initial position to the display position. At least one of the plurality of display parts is a dummy display part.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
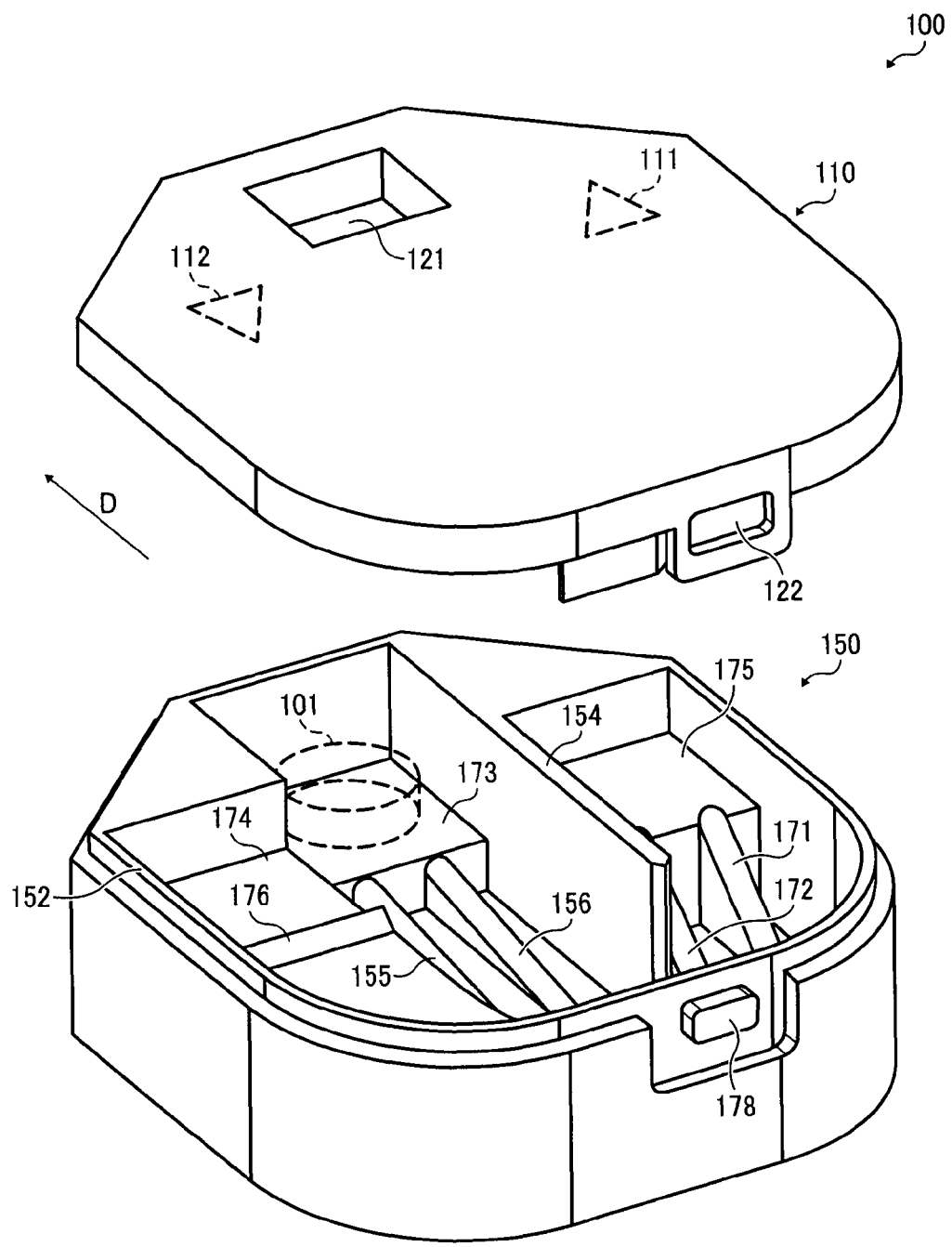
FIG. 1 is an exploded perspective view illustrating an impact detector for an indicator according the first embodiment of an impact detector.

In describing preferred embodiments illustrated in the drawings, specific terminology is employed for the sake of clarity. However, the disclosure of this patent application is not intended to be limited to the specific terminology so selected, and it is to be understood that each specific element includes all technical equivalents that operate in a similar manner and achieve a similar result.

Examples of an embodiment of the present invention, which exemplify an indicator for an impact detector, the impact detector, and a packaging container, will be described.

Three kinds of the impact detector, which are disposed to the indicator, will be described. The indicator is able to receive each of the three kinds of the impact detector.

Figure 2:
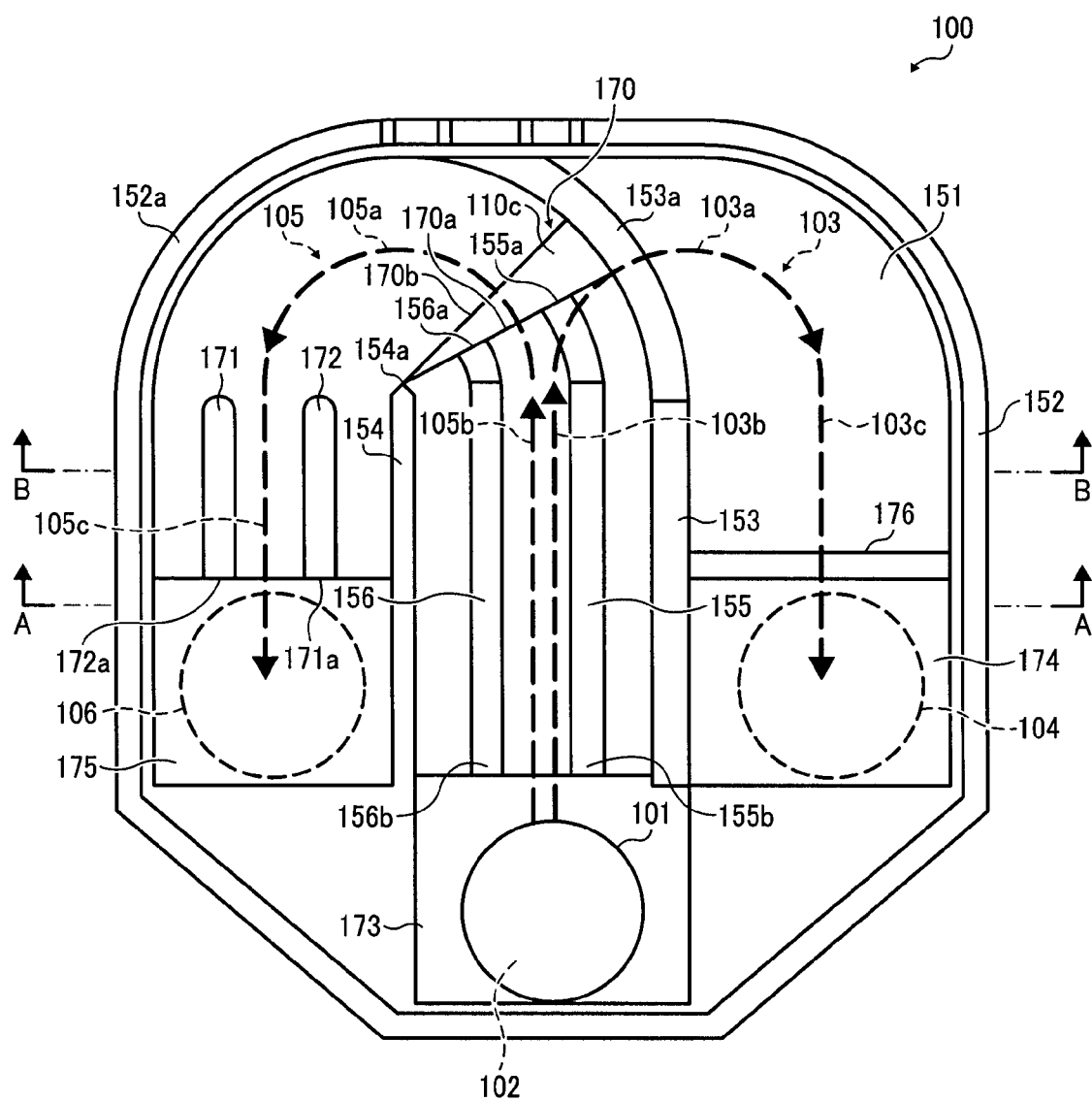
FIG. 2 is a plan view illustrating a case body of the impact detector shown in FIG. 1.
Figure 3:
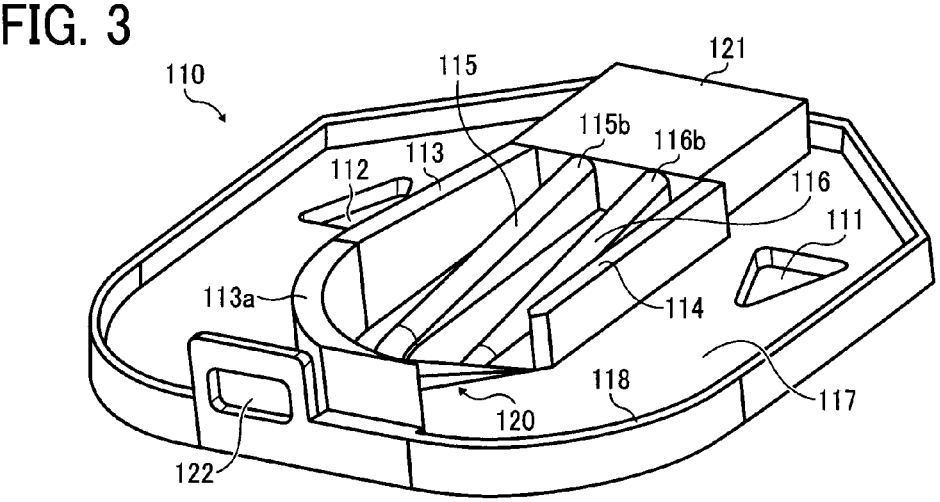
FIG. 3 is a perspective view illustrating a lid of the impact detector shown in FIG. 1.
Figure 4:
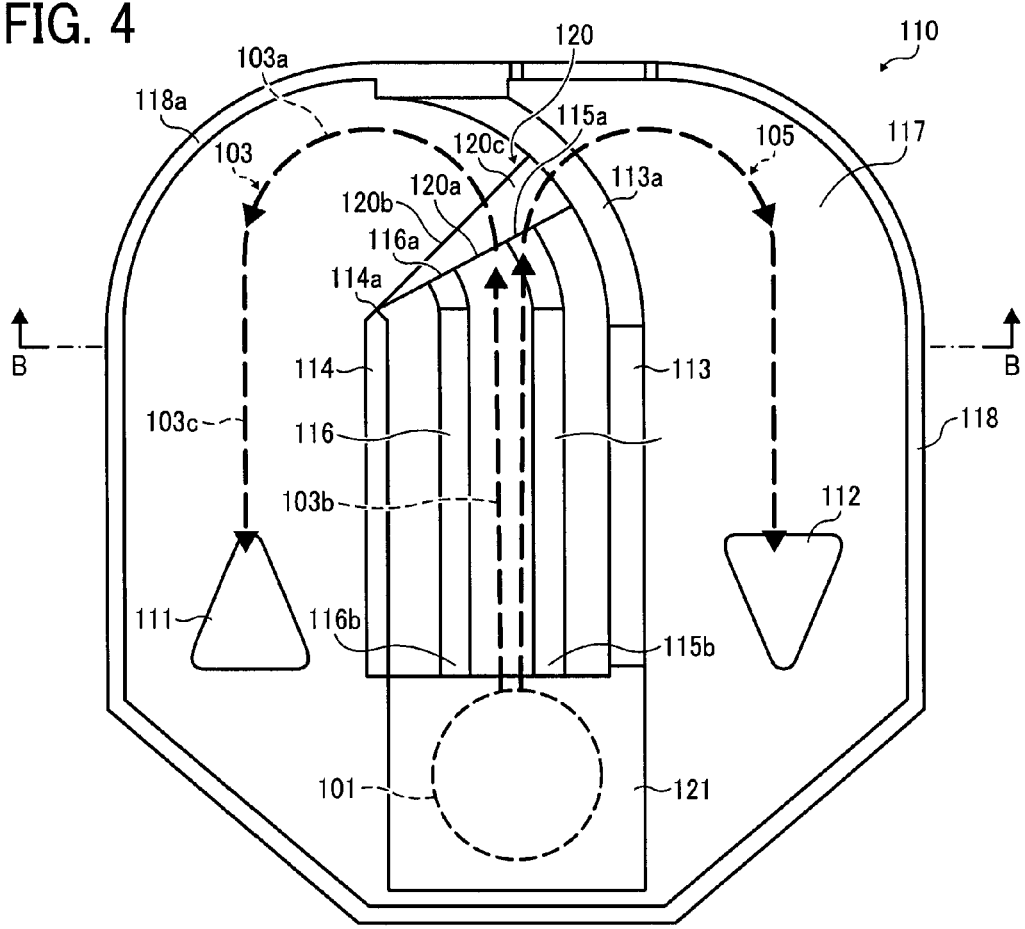
FIG. 4 is a plan view illustrating a lid of the impact detector shown in FIG. 1.

FIG. 1 is an exploded perspective view illustrating an impact detector 100 for use with an indicator, and FIG. 2 is a plan view from a front side illustrating a case body 150 of the impact detector 100 shown in FIG. 1. FIGS. 3 and 4 are a perspective view and a plan view illustrating a lid 110 of the impact detector 100 shown in FIG. 1, respectively.

The First Embodiment of an Impact Detector

Referring to FIG. 1, the impact detector 100 includes a lid 110, the case body 150 configured to engage the lid 110, and a detector such as weight 101, serving as a first weight, disposed inside the case body 150. The weight 101 is an aluminum column (e.g., tablet) and may be colored. As shown in FIG. 2, the impact detector 100 includes a lid-side transition path 103, serving as a first transition path, formed on the side of the lid 110 and a case-side transition path 105, serving as a second transition path, formed on the side of the case body 150. The weight 101 moves through the lid-side-transition path 103 or the case-side transition path 105, which are indicated by bold broken lines on the right or the left in FIG. 2 and formed between the lid 110 and the case body 150. As shown in FIG. 2, the impact detector 100 stands with the direction indicated by arrow D shown in FIG. 1 downward in an initial state. When the impact detector 100 tilts in a first direction toward the side of the lid 110, the weight 101 moves through the lid-side transition path 103 from an initial position 102 indicated by a solid line in FIG. 2 to a lid-side impact detection position 104 in a weight receiving portion 174 disposed on the right in FIG. 2. Even after the impact detector 100 reverts to the initial state, the weight 101 remains at the impact detection position 104 and can be observed through an inspection window 112 (first indicator) formed in the lid 110, facing the weight receiving portion 174. The lid-side transition path 103 includes a linear path 103b (linear portion) leading from the initial position 102, a bent path 103a (bent portion) arcing from the linear path 103b, and a linear path 103c leading from the bent path 103a toward the lid-side impact detection position 104.

Similarly, when the impact detector 100 tilts in a second direction toward the side of the case body 150 from the initial standing state shown in FIG. 2, the weight 101 moves through the case-side transition path 105 from the initial position 102 to a case-side impact detection position 106 in a weight receiving portion 175 disposed on the left in FIG. 2.

That is, the impact detector 100 indicates that the impact detector 100 has tilted toward the side of the lid 110 when the weight 101 is visible through the inspection window 112 and that the impact detector 100 has tilted toward the side of the case body 150 when the weight 101 is visible through the inspection window 111.

The case-side transition path 105 includes a linear path 105b (linear portion) leading from the initial position 101, a bent path 105a (bent portion) arcing from the linear path 105b, and a linear path 105c leading from the bent path 105a toward the case-side impact detection position 106.

Next, the lid 110 is described in further detail below.

For example, the lid 110 can be formed with a synthetic resin and may be transparent. As shown in FIGS. 3 and 4, the lid 110 includes a planar body 117 and a wall 118 projecting from an edge portion of the planar body 117 to surround the planar body 117. Additionally, the planar body 117 includes thinner portions forming the inspection windows 111 and 112 that, in the present embodiment, are triangular and wall portions 113 and 114 standing on a back side or inner side of the planar body 117 facing the case body 150.

The wall portions 113 and 114 together form the lid-side transition path 103 and serve as transition path limiters.

Additionally, rails 115 and 116, serving as multiple projections, to guide the weight 101 are formed inside the wall portions 113 and 114 on the backside of the planar body 117. The lid-side transition path 103 is enclosed by the curved wall 118 together with the wall portions 113 and 114 and is formed in the case body 150. Herein, the wall portion 113 includes a curved end portion 113a disposed in an upper portion in FIG. 4, and the wall 118 includes an arced portion 118a disposed in an upper portion in FIG. 4. The bent path 103a is formed between the curved end portion 113a of the wall portion 113 and the arced portion 118a of the wall 118, and the linear path 103b is formed between the wall portions 113 and 114.

Additionally, a recess 121 recessed from an outer side of the lid 110 toward the case body 150 is formed in the planar body 117 of the lid 110. The recess 121 is disposed facing a convexity 173 shown in FIG. 2 in which the initial position 102 of the weight 101 is positioned.

A distance between the recess 121 and the convexity 173 is set to prevent the weight 101 at the initial position 102 from moving significantly between the lid 110 and case body 150. It is noted that reference number 122 in FIG. 3 represents an engagement hole formed in the lid 110, and reference number 178 in FIG. 1 represents an engagement projection formed in the case body 150, to engage the engagement hole 122.

The rail 115 disposed on an outer circumference of the bent path 103a has a height greater than a height of the rail 116 disposed on an inner circumference of the bent path 103a. Further, the heights of the rails 115 and 116 are set so that highest end portions 115b and 116b of the rails 115 and 116 facing the case body 150 can contact the weight 101 that is in contact with the wall portion 114 disposed on the inner circumferential side of the bent path 103a.

This configuration provides a slope for the weight 101 to move on though the lid-side transition path 103, thus attaining smooth movement of the weight 101 as well as reduction in the thickness of the impact detector 100.

Additionally, as shown in FIG. 4, a deltaic or fan-shaped weight guide 120 is formed above upper end portions 115a and 116a of the rails 115 and 116.

The weight guide 120 has an edge portion 120a on the side of the rails 115 and 116, and a height of the edge portion 120a is identical or similar to the height of the upper end portions 115a and 116a of the rails 115 and 116.

As shown in FIG. 3, the weight guide 120 further includes a sloped portion 120c disposed between the edge portions 120a and the 120b. A height of the sloped portion 120c decreases toward an apex 114a of the wall portion 114 and is identical or similar to the height of the planar body 117 where the sloped portion 120c contacts the apex 114a of the wall portion 114.

With this configuration, the weight guide 120 can guide the weight 101 smoothly from the linear path 103b to the bent path 103a as well as prevent the weight 101 from moving back from the bent path 103 to the linear path 103b.

Additionally, the wall portion 114 serves as the transition path limiter and the apex 114a of the wall portion 114 is its leading edge portion in a direction in which the weight 101 moves from the initial position 102 to the lid-side impact detection position 104. The apex 114a is positioned at a downstream edge of the weight guide 120 in the weight moving direction from the initial position 102 to the lid-side impact detection position 104, that is, on an extension line of the edge portion 120b of the weight guide 101. With this configuration, the weight 101 can move through the bent path 103a reliably when the impact detector 100 detects an impact, that is, a container to which the impact detector 100 is attached falls, and the weight 101 can move to the inspection window 112 when the container recovers an initial position.

Next, the case body 150 is described in further detail below.

For example, the case body 150 can be formed with a synthetic resin and is colored. As shown in FIGS. 1 and 2, the case body 150 includes a planar body 151 and a wall 152 projecting from an edge portion of the planar body 151 to surround the planar body 151. Additionally, the planar body 151 includes wall portions 153 and 154 standing on an inner side of the planar body 151 facing the lid 110.

The wall portions 153 and 154 together form the case-side transition path 105 and serve as transition path limiter. The back side of the planar body 151, further includes rails 155 and 156, serving as multiple projections to guide the weight 101, formed inside the wall portions 153 and 154.

The case-side transition path 105 is enclosed by an arced portion 152a of the wall 152 together with the wall portions 153 and 154 and is formed in the case body 150. Herein, the wall portion 153 includes a curved end portion 153a disposed in an upper portion in FIG. 2. The bent path 105a is formed between the curved end portion 153a of the wall portion 153 and the arced portion 152a of the wall 152, and the linear path 105b is formed between the wall portions 153 and 154. Additionally, the convexity 173 projecting toward of the lid 110 is formed in the planar body 151 of the case body 150, and the convexity 173 corresponds to the initial position 102 of the weight 101.

The rail 155 (outer projection) disposed on an outer circumference of the bent path 105a has a height greater than a height of the rail 156 (inner projection) disposed on an inner circumference of the bent path 105a. Further, heights of the rails 155 and 156 are set so that highest end portions 155b and 156b (edge portion) of the rails 155 and 156 facing the lid 110 can contact the weight 101 that is in contact with the wall portion 154 disposed on the inner circumference of the bent path 105a. This configuration provides a slope to the weight 101 moving though the case-side transition path 105, thus attaining smooth movement of the weight 101 as well as reduction in the thickness (anteroposterior length) of the impact detector 100.

Additionally, a deltaic or fan-shaped weight guide 170 is formed above upper end portions 155a and 156a of the rails 155 and 156 in FIG. 2. The weight guide 170 has an edge portion 170a on the side of the rails 155 and 156, and a height of the edge portion 170a is identical or similar to the height of the upper end portions 155a and 156a of the rails 155 and 156.

By contrast, an edge portion 170b of the weight guide 170 on the side opposite the rails 155 and 156 includes steps descending toward inside the weight guide 170 between a highest portion of the edge portion 170b and the planar body 151. The weight guide 170 further includes a sloped portion 170c disposed between the edge portions 120a and 170b.

A height of the sloped portion 170c decreases toward an apex 154a (shown in FIG. 2) of the wall portion 154 and is identical or similar to the height of the planar body 151 where the sloped portion 170c contacts the apex 154a of the wall portion 154. With this configuration, the weight guide 170 can guide the weight 101 smoothly from the linear path 105b to the bent path 105a as well as prevent the weight 101 from moving back from the bent path 105a to the linear path 105b.

Additionally, the wall portion 154 serves as the transition path limiter and the apex 154a of the wall portion 151 is its leading edge portion in a direction in which the weight 101 moves from the initial position 102 to the case-side impact detection position 106. The apex 154a is positioned at a downstream edge of the weight guide 170 in the weight moving direction from the initial position 102 to the case-side impact detection position 106, that is, on an extension line of the edge portion 120b of the weight guide 170.

With this configuration, the weight 101 can move through the bent path 105a reliably when the impact detector 100 detects an impact, that is, the container to which the impact detector 100 is attached falls, and the weight 101 can move to the inspection window 111 when the container is returned to the initial position.

Additionally, the case body 150 includes the weight receiving portion 174 corresponding to the lid-side impact detection position 104 and the weight receiving portion 175 corresponding to the case-side impact detection position 106.

A weight stopper 176 that can be a projection extending in a direction perpendicular to the direction in which the weight 101 moves is formed in the weight receiving portion 174 to prevent the weight 101 from returning from the weight receiving portion 174 to the linear path 103c.

The weight stopper 176 is sloped on the side of the linear path 103c to facilitate movement of the weight 101 to the lid-side impact detection position 104 while a side of the weight stopper 176 facing the lid-side impact detection position 104 is perpendicular to the weight receiving portion 174 to prevent the weight 101 from returning to the linear path 103c.

Additionally, sloped rails 171 and 172 are formed in the linear path 103c of the case-side transition path 105 and connected to the weight receiving portion 175.

The sloped rails 171 and 172 guide the weight 101 moving through the linear path 105a of the case-side transition path 105 to the weight receiving portion 175. Leading edge portions 171a and 172a of the sloped rails 171 and 172, adjacent to the weight receiving portion 175, project from the weight receiving portion 175 slightly as shown in FIG. 1 to prevent the weight 101 from returning from the weight receiving portion 175 to the linear path 105c.

As described above, the impact detector 100 includes the lid-side transition path 103 and the case-side transition path 105 through which the weight 101 moves, both formed between the lid 110 and the case body 150.

In the first embodiment, the wall portions 153 and 154 and the rails 155 and 156 formed in the lid-side transition path 103 and the wall portions 113 and 114 and the rails 115 and 116 formed in the case-side transition path 105 are rotationally symmetrical relative to a centerline penetrating vertically the impact detector 100 in the standing state.

With this configuration, when the impact detector 100 falls in either the first direction to the side of the lid 110 or the second direction to the side of the case body 150, the weight 101 moves upward relatively in the impact detector 100 in FIGS. 2 and 4 toward the impact detection positions.

In either the first direction or the second direction, the weight 101 is forced to move along the lid-side transition path 103 or the case-side transition path 105 as if the weight 101 was pushed from above.

Therefore, the impact detector 100 can detect falling of the container to which the impact detector 100 is attached in both directions reliably. The impact detector 100 is effective particularly when the container falls at a relatively high velocity or a relatively large acceleration is given externally to the impact detector 100.

Next, operation of the impact detector 100 is described below.

When falling in the first direction to the side of the lid 110, the impact detector 100 operates as follows.

In this case, the weight 101 moves from the initial position 102 along the linear path 103b on the rails 115 and 116 formed in the lid 110.

As described above, the rail 115 is higher than the rail 116, and the weight 101 moves on the rails 115 and 116 while in contact with the wall portion 113.

The weight 101 moving on the rails 115 and 116 tilts, and stops after passing over the weight guide 120.

Subsequently, when the impact detector 100 reverts to the initial standing state, the weight 101 moves along the bent path 103a, guided by the edge portion 120b of the weight guide 120.

Then, the weight 101 is kept in the weight receiving portion 174 formed in the case body 150 and is positioned at the lid-side impact detection position 104.

At that time, because the apex 114a of the wall portion 114 is on the extension line extending from the edge portion 120b of the weight guide 120, the weight 101 can move smoothly along the edge portion 120b to the linear path 103c.

The weight 101 contained in the weight receiving portion 174 is prevented from moving back by the stopper 176 and is visible through the inspection window 112.

When falling in the second direction to the side of the case body 150, the impact detector 100 operates as follows.

In this case, the weight 101 moves from the initial position 102 along the linear path 105b of the case-side transition path 105 on the rails 155 and 156 formed in the case body 150.

As described above, the rail 155 is higher than the rail 156, and the weight 101 moves on the rails 155 and 156 while in contact with the wall portion 153.

The weight 101 moving on the rails 155 and 156 tilts, and stops after passing over the weight guide 170.

Subsequently, when the impact detector 100 reverts to the initial standing state, the weight 101 moves along the bent path 105a guided by the edge portion 170b of the weight guide 170.

Then, the weight 101 is kept in the weight receiving portion 175 formed in the case body 150 and is positioned at the case-side impact detection position 106.

At that time, because the apex 154a of the wall portion 154 is on the extension line extending from the edge portion 170b of the weight guide 170, the weight 101 can move smoothly along the edge portion 170b to the linear path 105c.

The weight 101 contained in the weight receiving portion 175 is prevented from moving back by the leading edge portions 171a and 172a of the sloped rails 171 and 172 and is visible through the inspection window 111.

The Second Embodiment of an Impact Detector

Figure 5:
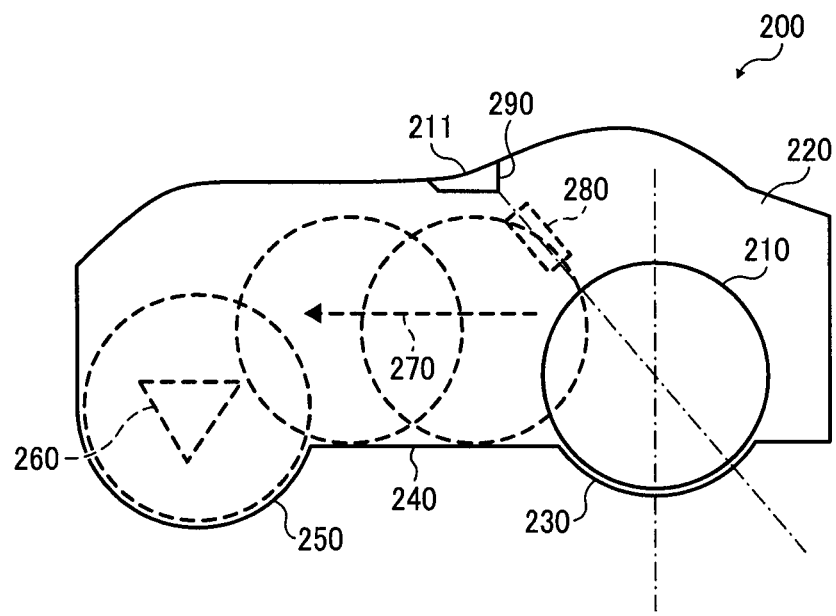
FIG. 5 is a schematic view illustrating an impact detector according the second embodiment of an impact detector.

FIG. 5 is a schematic view illustrating an impact detector 200 according the second embodiment.

The impact detector 200 according to the present embodiment includes a circular planar weight 210 contained in a case 220, detects a tilt in a single direction, and displays the fall.

The case 220 includes an initial recessed portion 230 in which weight 210 is held in an initial state, a lower wall 240 on which the weight 210 rolls, an impact detection recessed portion 250, and a inspection window 260.

When the impact detector 200 is tilted a predetermined angle in a counterclockwise direction in FIG. 5, the weight 210 moves out from the initial recessed portion 230, fits in the impact detection recessed portion 250, and is visible through the inspection window 260.

A transition path 270 through which the weight 210 moves is formed above the lower wall 240.

Additionally, a pawl 280 and a projection 290 are provided in the case 220.

The pawl 280 reduces the transition path 270 in the size in the direction of thickens of the weight 210, thereby restricting movement of the weight 210 when the weight 210 vibrates.

The projection 290 is provided on an upper wall 211 positioned above the lower wall 240 (transition path 270) and positioned facing the weight 210 held in the initial recessed portion 230.

In the second embodiment, when the impact detector 200 is tilted to a predetermined angle in the counterclockwise direction in FIG. 5, the weight 210 moves out from the initial recessed portion 230 and fits in the impact detection recessed portion 250.

Additionally, when the impact detector 200 is dropped or falls in an anterior or posterior direction, the pawl 280 and the projection 290 prevent the weight 210 from moving to the impact detection recessed portion 250.

Consequently, the impact detector 200 detects impact in only the predetermined direction and does not detect impact erroneously.

The Third Embodiment of an Impact Detector

Figure 6:
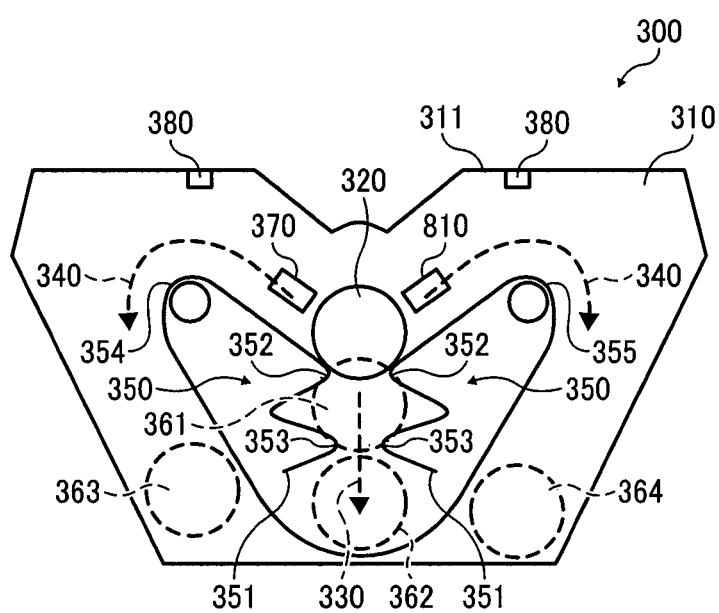
FIG. 6 is a schematic view illustrating an impact detector according the third embodiment of an impact detector.

FIG. 6 is a schematic view illustrating an impact detector 300 according the third embodiment. The impact detector 300 detects a fall or a tilt, and displays the fall or the tilt. The impact detector 300 includes a vertical transition path 330 which the weight 320 moves down when the case 310 is subjected to an impact in a vertical direction and a tilt direction path 340 which the weight 320 moves along when the case is subjected to an impact in a tilt direction. A case 310 and a leaf spring 350 form the tilt direction path 340 and the vertical transition path 330.

The impact detector 300 displays the history of the impact to the packaged article with the position of the weight 320. The leaf spring 350 includes free ends 351 and projections 352 and 353 so that the position of the weight 320 in the vertical transition path can differ depending on the magnitude of the impact.

When the impact in the vertical direction is relatively small, the weight 320 remains at an initial position supported by the upper projections 352 of the leaf spring 350. By contrast, when the impact from below is sufficiently great for the weight 320 to push away the projections 352 from each other, the weight 320 expands the gap between the projections 352, moves down, and then is caught between the lower projections 353. At that position, the weight 320 is visible through a first display 361.

When the impact is greater, the weight 320 further pushes away the lower projections 353 from each other and moves down to the bottom of the case 362. At that position, the weight 320 is visible through a second display 362.

Additionally, with the projections 353, the weight 320 does not move toward the initial position. By contrast, when the packaged article falls in a tilt direction, the weight 320 moves through the tilt transition path 340, beyond a curved portion of the leaf spring 354 or 355, and stops on a lower left or right of the leaf spring 350. At that position, the weight 320 is visible through a third display 363 or a fourth display 364.

Figure 7A:
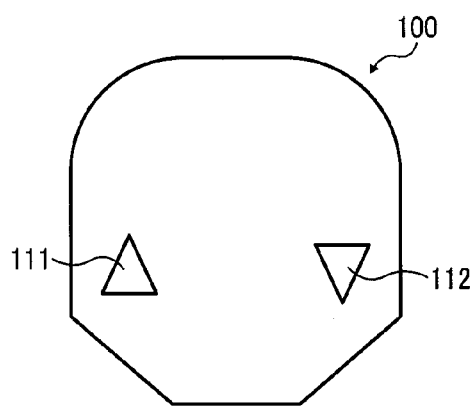
FIGS. 7A-7D are schematic views illustrating exemplary displays of the impact detector.
Figure 7B:
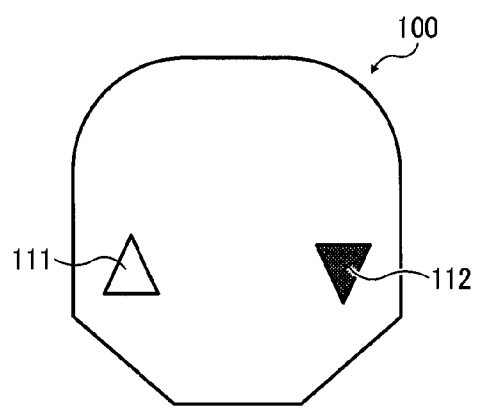
Figure 7C:
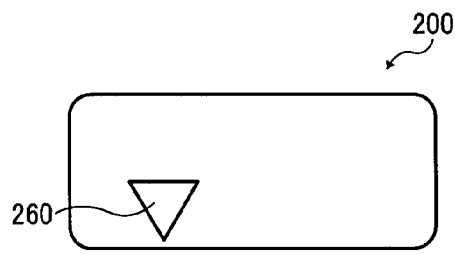
Figure 7D:
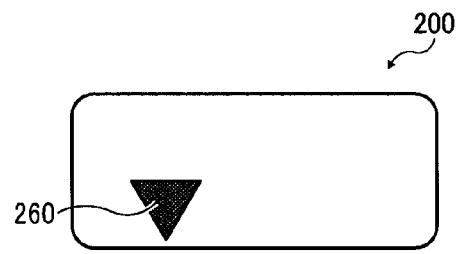

The impact detector 300 further includes pawls 370, 810 and projections 380. The pawls 370, 810 are disposed close to the initial position of the weight 320. The projections 380 are disposed on the left and the right of an upper center portion 311, respectively. In the third embodiment, although pawls 370, 810 and the projections 380 prevent the weight 320 from moving when the impact detector 300 receives impact that is not to be detected, the weight 320 can move smoothly when the impact detector 300 is dropped or tilted. Thus, the history of impact in the predetermined directions can be displayed An embodiment of an indicator for the impact detector shows as follows. The impact detectors (100, 200, 300) indicate the history of fall or tilt observably from a front side. FIGS. 7A-7D show schematic views of display examples of the impact detector. The inspection window, which forms a triangular shape and shows a tilting direction, may show the history of fall or tilt, for example as shown in FIGS. 7A and 7B. Examples of an inspection windows that form only a circular shape, which do not show a tilting direction, include the displays (361, 362, 363, 364) of the third impact detector 300. Moreover, the impact detector may include text or symbols, which describe the tilting directions of the inspection window.

An indicator for the impact detector is arranged based on a location of the inspection window of the impact detector, and includes a plurality of the display parts which display the weight when the impact detector is subjected to an impact or force.

An indicator for the impact detector can be one of the two embodiments of the indicator described below. The first embodiment of the indicator includes a dummy display part that is formed in a same shape as the display part that includes an observable display, and at least one display part that displays the weight when the impact detector is subjected to an impact or force.

The second embodiment of the indicator creates an illusion to reduce the visibility of the display parts that display the weight when the impact detector is subjected to an impact or force. In this case, a state of the indicator can be recognized from an image taken by electronic imaging device.

The First Embodiment of an Indicator

Figure 8A:
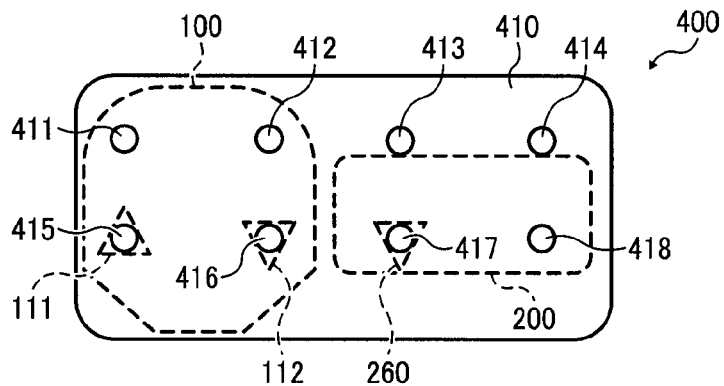
FIGS. 8A and 8B are schematic views illustrating an indicator for the impact detector in accordance with a first embodiment of a display.
Figure 8B:
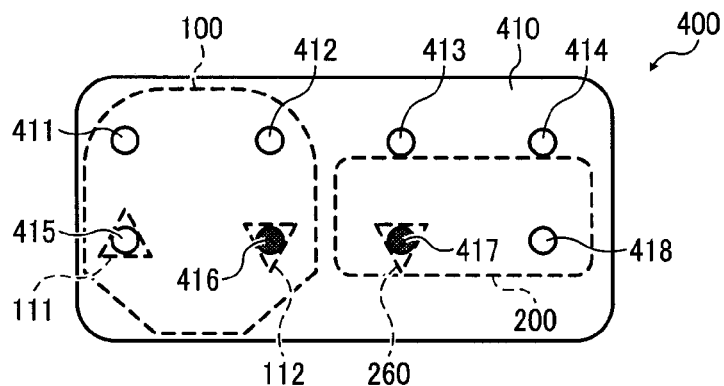

FIGS. 8A and 8B show schematic views of a first embodiment of an indicator 400 for the impact detector. The indicator 400 is a label to be mounted to and cover the impact detector mounted on a cardboard container. The indicator 400 is preferably designed to expose a fact that the indicator 400 was peeled from the impact detector. For example, the indicator 400 is an adherence type that is impossible to peel clearly, an exposed type to expose that the indicator 400 was peeled, or a hard adherence type that is difficult to peel.

As shown in FIG. 8A, the first impact detector 100 and the second impact detector 200 attach in position on the cardboard container, the indicator 400 mounts to the surface of the impact detectors 100 and 200. The indicator 400 includes eight display parts (411-418) on a base 410 that is opaque. The display parts 415 and 416 display the weight 101 of the impact detector 100 via inspection window 111 and 112. The display part 417 displays the weight 201 of the impact detector 200 via inspection window 260.

The three display parts (415, 416, 417) of the eight display parts are transparent parts.

The indicator 400 includes a plurality of the dummy display parts (411, 412, 413, 414, 418). An inspector is not able to see the first impact detector 100 and the second impact detector 200 that are located on a backside of the indicator 400, whose base 410 is opaque.

The indicator 400 of the first embodiment includes the transparent display parts (415, 416, 417) and the dummy display parts (411, 412, 413, 414, 418), each in the form a circle. Furthermore, the transparent display parts (415, 416, 417) are aligned with the inspection windows (111, 112, 260) of the impact detectors 100 and 200.

The transparent display parts (415, 416, 417) and the dummy display parts (411, 412, 413, 414, 418) are arranged in two rows and four columns. Thus, the inspector has difficulty differentiating between the transparent display parts (415, 416, 417) and the dummy display parts (411, 412, 413, 414, 418).

The dummy display parts (411, 412, 413, 414, 418), which do not show the inspection windows (111, 112) are indistinguishable from the transparent display parts (415, 416, 417), which show the inspection windows (111, 112). Therefore, one or more of the dummy display parts (411, 412, 413, 414, 418) are painted.

Alternatively, the dummy display parts (411, 412, 413, 414, 418) are transparent to be able to see the cardboard container the impact detectors (100, 200) are mounted to. Furthermore, the case body 150, that is the background of the inspection windows (111, 112, 260), is painted the same color as the cardboard container.

According to the indicator 400 for the impact detector as shown in FIG. 8B, when the impact detectors (100, 200) detect the impact or force, the inspection windows 260 and 112 display weights (101, 210). Thus, the display weights (101, 210) can be seen through the transparent parts (416, 417).

However, the inspector does not know in advance about the position or kind of the impact detectors (100, 200) on the container. Therefore, the inspector does not know a meaning (for example, the display displays whether an impact has occurred or not or displays a direction of the impact) of displays that display the weight as appearing at a particular position of the inspection window.

Therefore, the indicator prevents the removing or tampering with the impact detectors (100, 200) by a third party.

The Second Embodiment of an Indicator

Figure 9A:
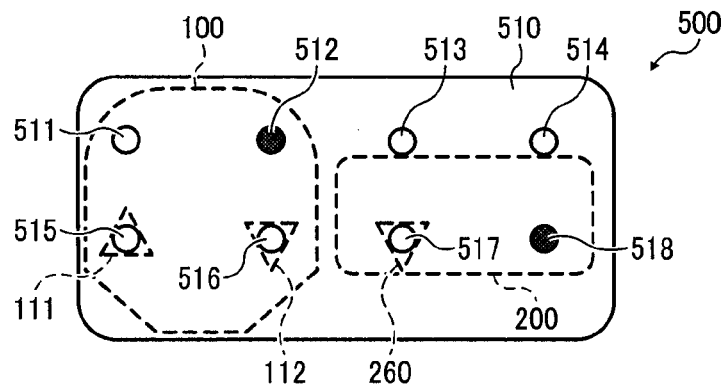
FIGS. 9A and 9B are schematic views illustrating an indicator for the impact detector in accordance with a second embodiment of the display.
Figure 9B:
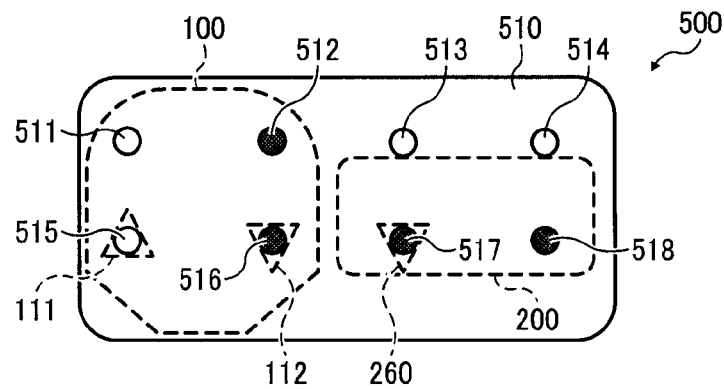

An indicator 500 for the impact detector, as a second embodiment of an indicator, is a modification of the indicator 400 described above as a first embodiment of the indicator. The indicator 500 relates to the indicator 400. FIGS. 9A and 9B show schematic views of a second embodiment of an indicator for the impact detector. The indicator 500 is a label to be mounted to and cover the impact detectors (100, 200) mounted on a cardboard container in the same manner as the indicator 400. The indicator 500 is preferably designed to expose a fact that the indicator 500 was peeled from the impact detector. For example, the indicator 500 is an adherence type that is impossible to peel clearly, an exposed type to expose that the indicator 500 was peeled, or a hard adherence type that is difficult to peel.

The indicator 500, as shown in FIG. 9A, includes transparent display parts (515, 516, 517) on a base 510 is opaque. The transparent display parts (515, 516) display the weight 101 of the impact detector 100 via inspection windows 111 and 112. The transparent display part 517 displays the weight 210 of the impact detector 200 via inspection window 260.

The indicator 500 includes a plurality of the dummy display parts (511, 512, 513, 514, 518). An inspector is not able to see the first impact detector 100 and the second impact detector 200 that are located on the backside of the indicator 500 whose base 510 is opaque.

The transparent display parts (515, 516, 517) and the dummy display parts (511, 512, 513, 514, 518) are formed in the shape of a circle. Furthermore, the transparent display parts (515, 516, 517) are aligned with an inside of the inspection windows (111, 112, 260) of the impact detector (100, 200)

The transparent display parts (515, 516, 517) and the dummy display parts (511, 512, 513, 514, 518) are arranged in two rows and four columns. Thus, the inspector has difficulty differentiating between the transparent display parts (515, 516, 517) and the dummy display parts (511, 512, 513, 514, 518).

Furthermore, the dummy display parts (512, 518) of the indicator 500 display fake weights. For example, the display parts (512, 518) are painted the same color of the surface of the weights (101, 210).

The dummy display parts (511, 513, 514), which do not show the inspection windows (111, 112, 260), are indistinguishable from the transparent display parts (515, 516, 517), which show the inspection windows (111, 112, 260). Therefore, one or more of the dummy display parts (511, 512, 513, 514, 518) are painted.

Alternatively, the dummy display parts (511, 512, 513, 514) are transparent to be able to see the cardboard container.

Furthermore, the case body 150, that is the background of the inspection windows (111, 112, 260), is painted the same color as the cardboard container.

According to the indicator 500 the impact detectors 100, 200 as shown in FIG. 9B, when the impact detector (100, 200) detects the impact or force, the inspection windows 112 and 260 display weights (101, 210).

However, the inspector does not know in advance about the position or kind of the impact detectors (100, 200). Therefore, as a result of the display parts (512, 518) displaying fake weights, the inspector is unable to determine a meaning (for example, the display displays whether an impact has occurred or not, a direction of the impact, or whether the display is real or an illusion) of displays that display the weights at particular positions of the inspection window.

Therefore, the indicator prevents removing or tampering with the impact detectors (100, 200) by a third party.

The location and the number of the dummy display parts are not limited to the above-mentioned examples and are changeable as needed. The number of the impact detectors is not limited to the above-mentioned examples and is changeable as needed. The type of the impact detector is not limited to the first, second or third impact detector and may by chosen from other types of impact detectors. The indicator is not limited to a label mounted to the impact detector and may serve as the inspection window of the impact detector. The way of detecting the impact is not limited to using the weight and another detector may color the inspection window by impact.

The Third Embodiment of an Indicator

A third embodiment of an indicator 600 for the impact detector relates to the aforementioned second embodiment of the display. The display part causes an illusion to reduce the visibility of the inspection windows (111, 112, 260) to an inspector. However, a state of the display can be recognized from an image taken by an electronic imaging device.

Figure 10:
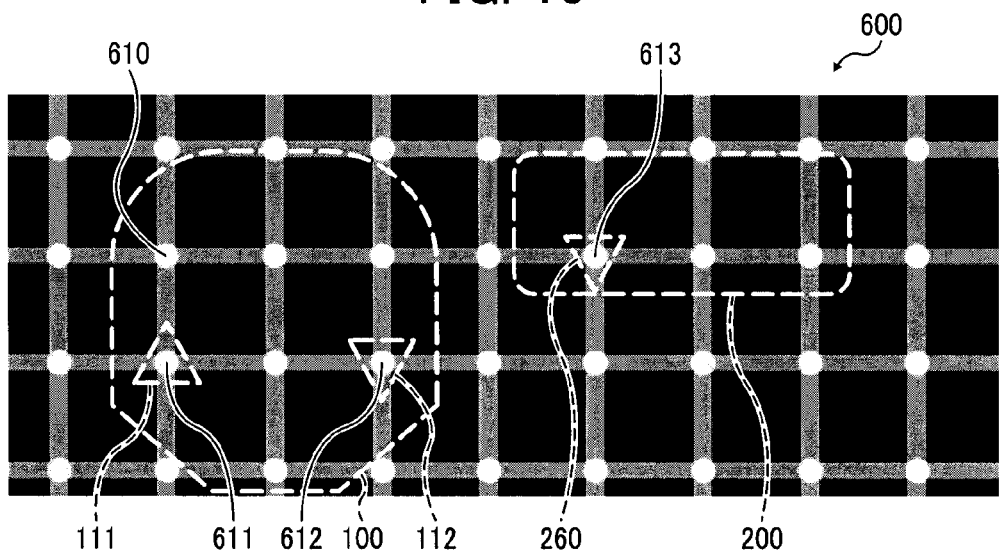
FIG. 10 is a schematic view illustrating an indicator for the impact detector in accordance with a third embodiment of the display.

FIG. 10 shows a schematic view of the third embodiment of an indicator for the impact detector. The impact detectors (100, 200) are located on the backside of the indicator 600. The indicator 600 creates an illusion to reduce the visibility of the inspection windows (111, 112, 260) of the impact detectors (100, 200).

The indicator 600 uses a "scintillating grid" to create a geometric optical illusion. Schrauf M, Lingelbach B & Wist E disclosed the scintillating grid illusion in 1997. The scintillating grid illusion occurs at an intersection 610 that is a white portion superimposed on orthogonal gray bars on a black background. All other intersections of the grid are the same as the intersection 610.

When the eyes of an inspector focus on one intersection, the intersection continues to appear white while the other intersections appear to blink white and black.

The inspection windows (111, 112, 260) are located at the intersections (611, 612, 613). The other intersections, where the inspection windows (111, 112, 260) are not located, are dummy intersections. Thus, even if the inspection windows (111, 112, 260) of the impact detectors (100, 200) display the weight (101, 210), it is difficult for the inspector to see the weight with the naked eye due to the occurrence of the illusions at all intersections. Additionally, the weight (101, 210) can be painted grayscale (white, black, gray) to make it more difficult for the inspector to see the weight with the naked eye.

However, a state of impact can be recognized from an image, recorded by the electronic imaging device, of the inspection windows (111, 112, 260) via the indicator 600.

The Fourth Embodiment of an Indicator

Figure 11:
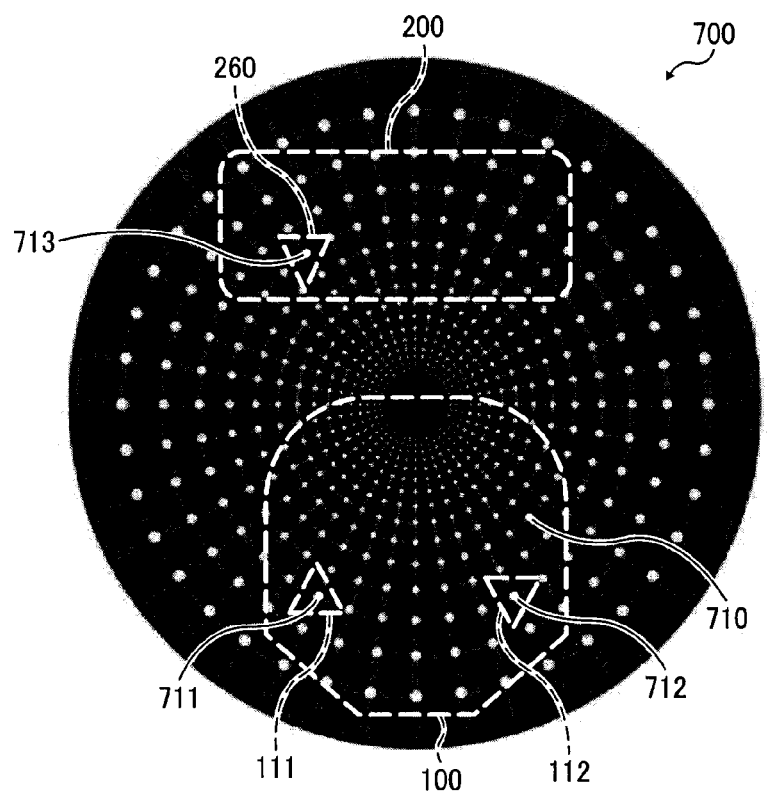
FIG. 11 is a schematic view illustrating an indicator for the impact detector in accordance with a fourth embodiment of the display.

FIG. 11 shows a schematic view of a fourth embodiment of an indicator for the impact detector. The indicator 700 uses a "scintillating grid" illusion that is the same as the third embodiment of the indicator 600. The indicator 700 forms intersections (710, 711, 712, 713) between concentric circles and radial lines. The impact detectors (100, 200) are located on the backside of the indicator 700 in the same manner as the third embodiment of the display.

The indicators for the impact detector shown as the third and fourth embodiments are not limited to the "scintillating grid" illusion. Thus, the indicator may use other illusions.

The way of detecting the impact is not limited to the weight and may color the inspection window by impact.

The number of the impact detectors is not limited to the above-mentioned embodiments and is changeable as needed. The type of the impact detector is not limited to the first, second or third impact detector and other types of the impact detector may be chosen.

The indicator is not limited to a label mounted to the impact detector and may serve as the inspection window of the impact detector.

The First Embodiment of a Container

Figure 12:
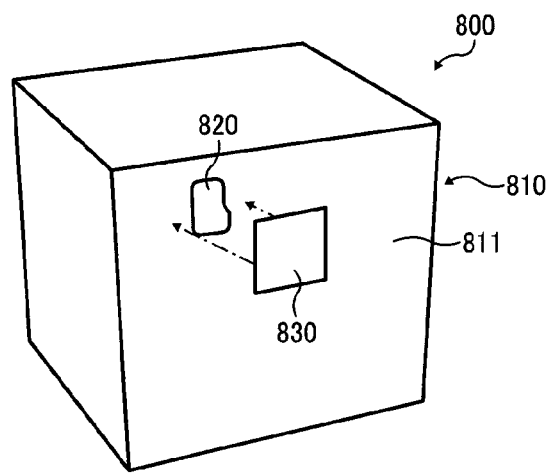
FIG. 12 is a perspective view illustrating a first embodiment of a container.

FIG. 12 shows a perspective view illustrating a first embodiment of a container. The container 800 includes the impact detector 820 mounted to a side surface of the cardboard packaging box 810 and an indicator 830 for the impact detector 830 attached over the impact detector 820.

The impact detector 820 can be one of the impact detectors (100, 200, 300) or another impact detector.

The indicator 830 can be one of the indicators (400, 500, 600, 700). The indicator 830 can include one or more of the indicators (400, 500, 600, 700) or other indication forms.

It is preferable to align the position of inspection window of the impact detector and the transparent display part of the indicators.

The Second Embodiment of a Container

Figure 13A:
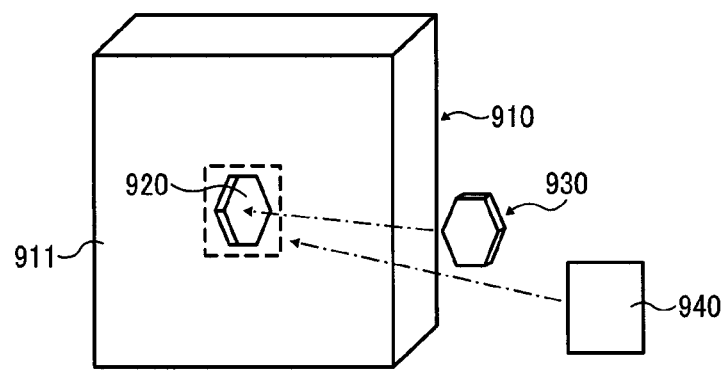
FIGS. 13A and 13B are perspective views illustrating a second embodiment of a container.
Figure 13B:
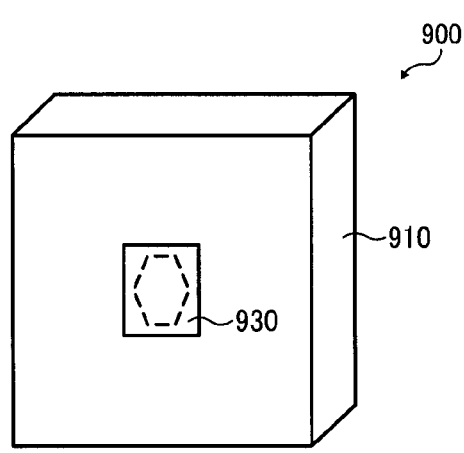

FIGS. 13A and 13B show perspective views illustrating a second embodiment of a container. The container 900 is assembled according to the following procedure. First of all, an aperture 920 is formed at a side surface 911 of the cardboard packaging box 910 as shown in FIG. 13A. After that, the impact detector 930 is embedded in the aperture 920. After that, the impact detector 930 is attached over the impact detector 930 as shown in FIG. 13B.

The impact detector 930 can be one of the impact detectors (100, 200, 300) or another impact detector.

The indicator 940 can be one of the indicators (400, 500, 600, 700). The indicator 940 can include one or more of the indicators (400, 500, 600, 700) or other indication forms.

According to the second embodiment of the container 900, the impact detector 930 does not project from an outer surface of the cardboard packaging box 910. Thus, it is possible to arrange the plurality of containers 900 efficiently and prevent the impact detector 930 from breaking due to contact with the impact detectors 930 of other containers.

The Third Embodiment of a Container

Figure 14A:
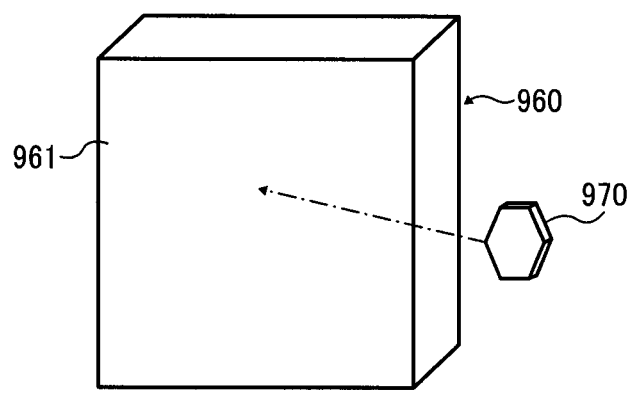
FIGS. 14A and 14B are perspective views illustrating a third embodiment of a container.
Figure 14B:
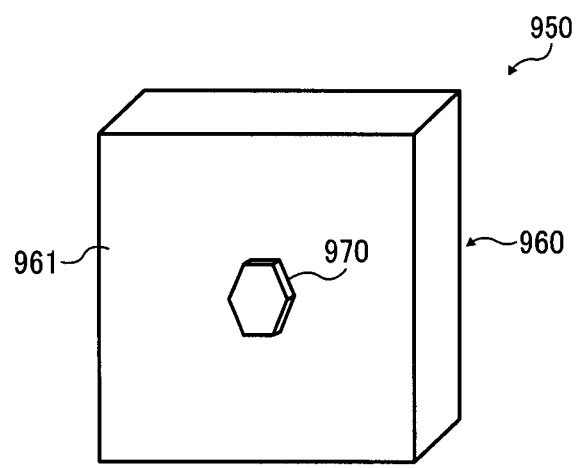

FIGS. 14A and 14B show a perspective view illustrating a third embodiment of a container.

The impact detector can be one of the impact detectors (100, 200, 300) or another impact detector.

The indicator can be one of the indicators (400, 500, 600, 700). The indicator can include one or more of the indicators (400, 500, 600, 700) or other indication forms.

According to a third embodiment of the container 950, an impact detector 970 is mounted on a nonrandom face 961 of packaging box 960 by double-sided tape. The indicator of the impact detector 970 may form an outer surface of the impact detector 970 or the indicator for the impact detector may be attached to the impact detector 970.

According to the third embodiment of a container 950, the impact detector is able to be mounted on the nonrandom face of the packaging box.

Numerous additional modifications and variations are possible in light of the above teachings. It is therefore to be understood that, within the scope of the appended claims, the disclosure of this patent specification may be practiced otherwise than as specifically described herein.

What is claimed is:

1. An indicator for an impact detector, comprising:
a display part to display a detector to outside of the indicator when an impact or force changes a condition of the detector; and
a dummy display part that is colored such that the detector is not visible through the dummy display part, the dummy display part and the display part being a same shape.

2. The indicator for an impact detector according to claim 1, wherein
the dummy display part displays a same color as the display part before the display part displays the change of the condition of the detector.

3. The indicator for an impact detector according to claim 1, wherein
the dummy display part is painted a same color as a displayed color of the display part when the display part displays the change of the condition of the detector.

4. The indicator for an impact detector according to claim 1, wherein
the shape of the display part and the dummy display part is circular.

5. The indicator for an impact detector according to claim 1, wherein the display part is located on a base,
wherein the base is opaque, and
wherein the display part is transparent.

6. An impact detector, comprising:
a detector including a moveable weight to receive an impact or a force;
a cover including a path to guide the weight from an initial position to a display position; and
the indicator as claimed in claim 1.

7. The impact detector according to claim 6, wherein
the cover includes an inspection window, and
the inspection window is the indicator.

8. A packaging container, comprising:
a package; and
an impact detector disposed on the package, the impact detector including
a detector including a moveable weight to receive an impact or a force;
a cover including a path to guide the weight from an initial position to a display position; and
the indicator as claimed in claim 1.

9. The packaging container according to claim 8, wherein the package and the impact detector are a same color.

10. The packaging container according to claim 8, wherein the impact detector is positioned on a side of the package.

11. The indicator for an impact detector according to claim 1, wherein
the display part and the dummy display part are a same color.

12. The indicator for an impact detector according to claim 1, wherein
the display part is one of a number of display parts,
the dummy display part is one of a number of dummy display parts, and
the number of dummy display parts is larger than the number of display parts.

13. The indicator for an impact detector according to claim 1, wherein
the dummy display part is not in a position to display the detector to outside of the indicator when the impact or force changes the condition of the detector.

14. An indicator for an impact detector, comprising:
a display part to display a detector to outside of the indicator when an impact or force changes a condition of the detector; and
an illusion part to reduce visibility of the display part.

15. The indicator for an impact detector according to claim 14, wherein
the condition of the detector is visible from an image taken by an electronic imaging device.

16. The indicator for an impact detector according to claim 14, wherein
the illusion part is a scintillating grid illusion to create a geometric optical illusion.

17. The indicator for an impact detector according to claim 14, wherein
the illusion part includes a plurality of lines,
the display part is one of a plurality of display parts, and
each of the plurality of display parts is disposed on an intersection of the lines.

18. The indicator for an impact detector according to claim 14, wherein the illusion part reduces the visibility of an inspection window of the impact detector.

19. An impact detector, comprising:
a detector including a moveable weight to receive an impact or a force;
a cover including a path to guide the weight from an initial position to a display position; and
the indicator as claimed in claim 14.

20. A packaging container, comprising:
a package; and
an impact detector disposed on the package, the impact detector including
 a detector including a moveable weight to receive an impact or a force;
 a cover including a path to guide the weight from an initial position to a display position; and
 the indicator as claimed in claim 14.

* * * * *